United States Patent [19]

Wester et al.

[11] 4,388,890

[45] Jun. 21, 1983

[54] DEVICE FOR LOCATING IN BUILDINGS THE EXACT POSITION OF HIDDEN OBJECTS

[76] Inventors: Bengt Wester; Anders West, both of Norra Hyllievägen 103, Malmö, Sweden, S 21622

[21] Appl. No.: 216,315

[22] Filed: Dec. 12, 1980

[30] Foreign Application Priority Data

Dec. 20, 1979 [SE] Sweden .................................. 7910517

[51] Int. Cl.³ ............................................ H02G 15/06
[52] U.S. Cl. ............................... 116/204; 33/DIG. 1; 33/DIG. 10; 174/48; 116/209
[58] Field of Search ..................... 116/204, 209; 269/8; 220/3.3, 3.2, 3.4; 174/48; 30/358; 33/DIG. 1, DIG. 10, 174 G

[56] References Cited

U.S. PATENT DOCUMENTS 1,719,812  7/1929  Shaw ............................... 33/DIG. 1
4,016,827  4/1977  Lawrence ........................... 116/204
4,087,913  9/1978  Jackson ......................... 33/DIG. 10

FOREIGN PATENT DOCUMENTS 1021451 12/1957 Fed. Rep. of Germany ........ 174/48
1231330 12/1966 Fed. Rep. of Germany ........ 174/48

Primary Examiner—James J. Gill
Assistant Examiner—Denis E. Corr
Attorney, Agent, or Firm—Schwartz, Jeffery, Schwaab, Mack, Blumenthal & Koch

[57] ABSTRACT

The present invention relates to a device for locating in buildings the exact position of hidden objects, preferably boxes for electrical installations which are to be exposed by providing a hole in a covering building unit, such as a platelike wall, roof, or floor unit, substantially opposite the object. The locating device may be used for all known types of covering building units without complicating rational mounting of the covering building unit. The locating device according to the invention comprises a locating magnet having a first magnetic body which is mounted on the object at one side of the building unit hiding the object, and a second magnetic body which is movable along the other side of the building unit for sensing the position of the first magnetic body mounted at the object.

6 Claims, 2 Drawing Figures

DEVICE FOR LOCATING IN BUILDINGS THE EXACT POSITION OF HIDDEN OBJECTS

BACKGROUND OF THE INVENTION

FIELD OF THE INVENTION

The present invention relates to a device for locating in buildings the exact position of hidden objects, preferably boxes for electrical installations which are to be exposed by providing a hole in a covering building unit, preferably a plate-like wall, roof or floor unit, just opposite the object.

DISCUSSION OF RELATED ART

To locate hidden boxes for exposure by providing holes in covering building plates after application on frame works, various locating methods have been used, which, however, do not function satisfactorily. Generally, difficulties in locating the exact position of the hidden box were encountered, whereby the exposing hole is often misplaced relative to the box, which means time-consuming and circumstantial work. In order to eliminate these problems, auxiliary means have been developed, but these known auxiliary means do not provide an exact correct position of the exposing hole, they may only be used for certain types of building plates and they often complicate a rational mounting of the building plate.

SUMMARY OF THE INVENTION

The object of the present invention is to eliminate these drawbacks and provide a simple locating device which permits exact location of the hidden objects and which may be used for all known types of covering building units without complicating a rational mounting of the covering building unit. This is accomplished according to the invention while the locating device has all the characterizing features defined in the claims.

BRIEF DESCRIPTION OF THE DRAWINGS

The invention will be further described below with reference to the accompanying drawings, in which.

DETAILED DESCRIPTION OF THE PREFERRED EMBODIMENT

Figure 1:
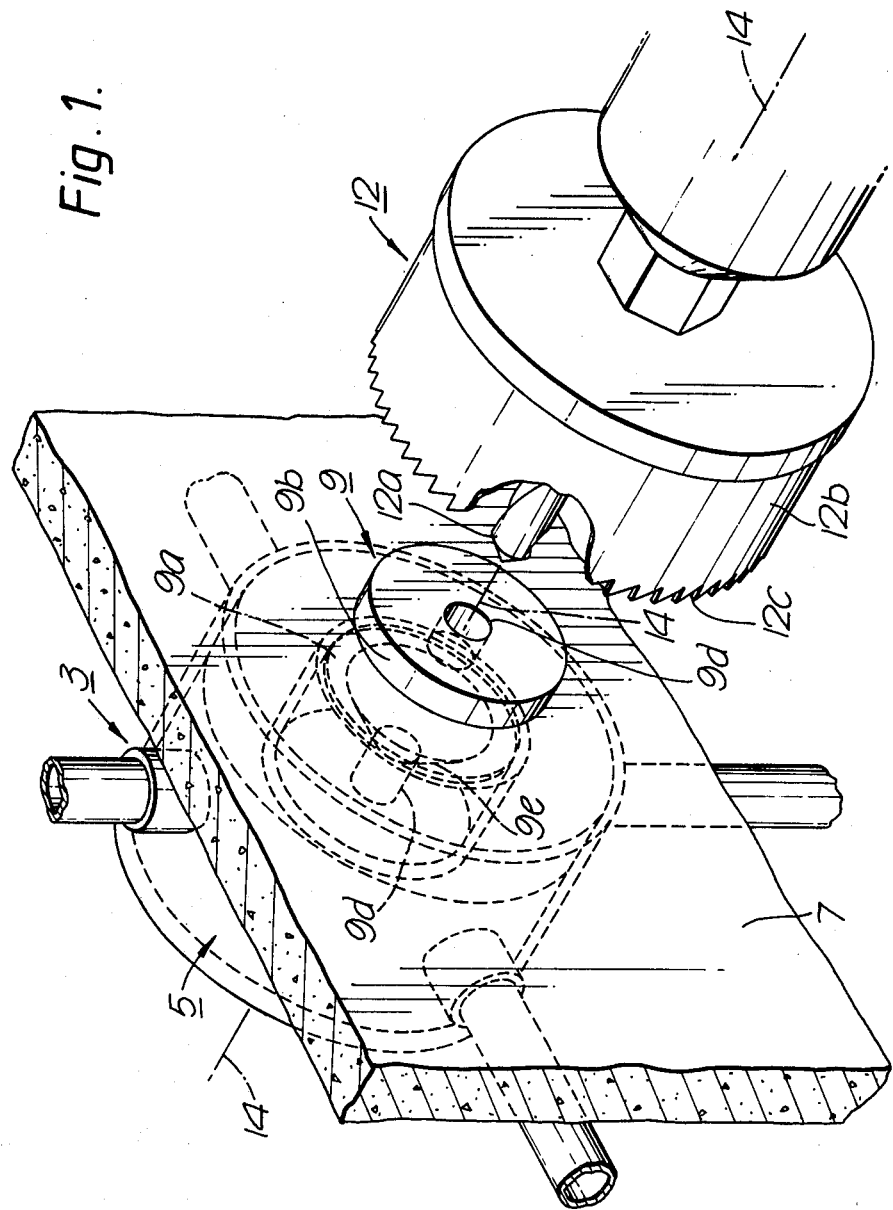
FIG. 1 illustrates a device according to the invention in a perspective view.
Figure 2:
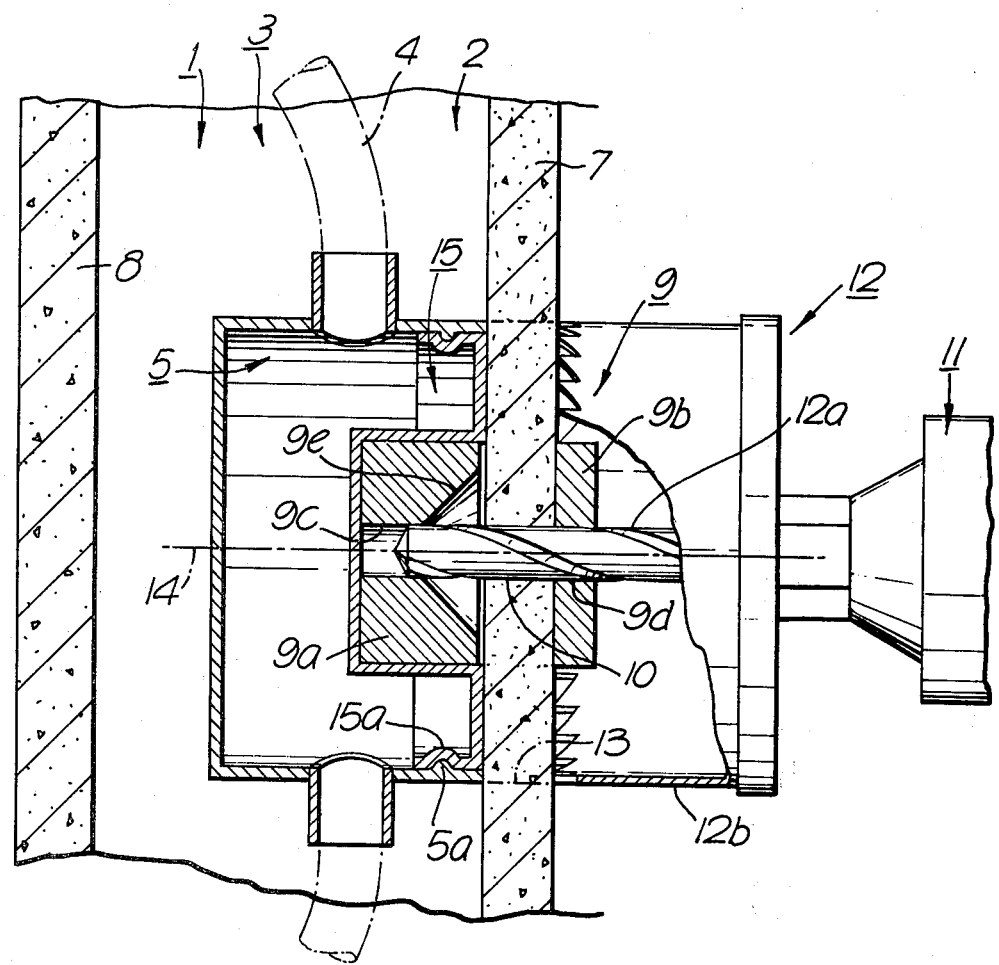
FIG. 2 illustrates a device according to the invention in a sectional view.

The drawings show a wall arrangement 1 comprising a frame-work structure 2 and an electrical installation 3 including wires 4, only one wire being shown with dashed and dotted lines, and boxes 5 for the wires 4. The electrical installation 3 is mounted on the face sides of the frame-work structure 2 and after finishing the installation, the frame-work structure is provided with plate-like wall elements 7.

In order to locate the exact position of the box 5 from the outside by simple means, irrespective of the hardness of the plate-like wall element 7 and without affecting the possibilities of rational mounting of the wall element 7, the localization is obtained by means of a locating magnet 9, comprising a first magnetic body 9a which is mounted in the object 5 on one side of the building unit 7 hiding the object, and a second magnetic body 9b which is movable along the other side of the covering building unit for sensing the position of the first magnetic body mounted in the object. This locating device permits fastening of the plate-like wall element 7 without regard to subsequent hole making, and when the element is secured in a rational way by a method known per se, the magnetic body 9b is moved along the outside thereof until one of the magnetic bodies attracts the other or both magnetic bodies attract each other.

The properties of the magnetic bodies 9a, 9b have the effect that the magnetic body 9b tries to position itself just opposite the magnetic body 9a, and with opposite poles directed itself towards each other. Accordingly it will be possible to rapidly and exactly locate the magnetic body 9a and thereby the exact position of the box 5 behind the plate-like wall element 7. When the position of the box 5 is exactly located, the information obtained is used in that a hole is drilled through the plate-like wall element 7 opposite the box 5 by means of a drilling machine 11 with a box drill device 12 comprising a central twist drill 12a and a drill sleeve 12b with a side cutting edge 12c. The box drill device 12 is placed against the plate-like wall element on the point determined by means of the locating magnet 9 and thereafter, drilling of a central hole 10 is made and then the drill sleeve 12b cuts out a hole 13 substantially of the same size as the box 5 for exposure thereof.

The magnetic bodies may have various forms, but preferably at least one of the bodies is provided with a hole 9c and/or 9d for guiding the twist drill 12a of the box drill device 12. While the magnetic body 9b has a hole 9d, it may, after locating the box 5, remain in the position on the plate-like wall element 7 determined by the magnetic field. The hole 9d of the magnetic body 9b may then be used directly for setting and guiding the twist drill 12a, whereby no marks need to be put on the wall element for setting the box drill device 12.

An especially suitable embodiment of the locating magnet 9 is obtained by providing the magnetic body 9a with a preferably conically tapering recess 9e for guiding the box 5 so that the twist drill 12a enters into the central hole 9c if the twist drill 12a deflects from the center line 14 of the box 5 and magnetic body 9a. Therefore the box 5 may be moved slightly so that the twist drill 12a may be guided correctly before the drill sleeve 12b starts to drill the exposure hole 13 for the box 5 in the plate-like wall element 7.

The mounted magnetic body 9a comprises or is preferably included in a coupling means 15 which is securable to the box 5 and releasable therefrom after exposure thereof, such that all parts of the locating magnet 9 may be released for exposure of the interior of the box 5 and used at another site.

The coupling means 15 and the box 5 preferably have lock fitting portions 15a, 5a for locking the coupling means by insertion thereof into the box. Furthermore, the coupling means 15 preferably comprises a cap provided with the magnetic body 9a.

The localization work is facilitated and may be conducted with great exactness while both the magnetic bodies 9a, 9b are annular in shape and with substantially the same outer diameter and central-hole diameter. In order to obtain a strong magnetic field which without difficulties permits safe securing of the magnetic body 9a in its position on the outside of the wall element 7 after locating the box 5, both magnetic bodies 9a, 9b have such magnetic properties that each generates a magnetic field, which means strong attraction when the fields coincide.

Thus the invention permits by simple means to locate the exact position of e.g. a hidden box 5 such that the exposing hole 13 is positioned relative to the box 5. Thus it is possible to completely cover the exposing hole 13 with the contact member (not shown) belonging to the box 5. This contact member has a rear portion which engages the box and a front portion which provides a cap engaging the outside of the wall element 7. While the box 5, exposing hole 13 and contact member are centered in relation to each other, the cap covers the exposing hole 13 and no repair of non-covered portions of the hole is required.

The invention is of course not limited to locating boxes in frame-work walls 1 comprising a frame-work 2 with plate-like wall elements 7, 8, but may be used for locating quite different objects hidden by wall, roof and floor elements or by other building elements. The locating magnet is preferably a permanent magnet but may also be of another type, whereby only one magnetic body can generate a magnetic field while the other is made of a magnetically attractable material. Furthermore, the magnetic bodies may have another form than round and each body may consist of several parts. In other words, the invention is not limited to the embodiment described and shown in the drawings, but may vary within the scope of the claims.

What is claimed is:

1. A device for locating hidden objects such as electrical boxes, in buildings which objects are to be exposed by providing a hole in a covering unit, such as a plate like wall, over the object, said device comprising:

a first annular magnetic body mounted at the object to be located on one side of said covering unit, said first body having a guide hole formed therein, and having a conically tapered recess formed around said guide hold, said recess having a diameter greater than the diameter of said guide hole;

a second annular magnetic body which is movable along the other side of said covering unit for sensing the position of said first magnetic body, said second body having a guide hole formed therein, said guide holes being positioned on said bodies so as to be alignable on opposite sides of said covering unit for guiding a drill through said covering unit;

means for releasably attaching said first magnetic body to said object whereby said first magnetic body can be removed from said object after said object is located and exposed; and wherein one of said magnetic bodies is a permanent magnet.

2. The device as set forth in claim 1, wherein both of said magnetic bodies comprise permanent magnets.

3. The device as set forth in claim 2, wherein said permanent magnets have the same outer diameter.

4. The device as set forth in claim 1, wherein said means and said object include interfitting locking portions.

5. The device as set forth in claim 4, wherein said means comprises a cap which fits into said object, and wherein said first magnetic body is mounted to said cap.

6. The device as set forth in claim 1, wherein said object is an electrical box.

* * * * *